United States Patent
Rubino et al.

(10) Patent No.: US 7,855,009 B2
(45) Date of Patent: Dec. 21, 2010

(54) SANDWICH CATHODE ELECTROCHEMICAL CELL WITH WOUND ELECTRODE ASSEMBLY

(75) Inventors: Robert S Rubino, Williamsville, NY (US); Hong Gan, Williamsville, NY (US); Esther S Takeuchi, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 959 days.

(21) Appl. No.: 11/532,126

(22) Filed: Sep. 15, 2006

(65) Prior Publication Data

US 2007/0059599 A1    Mar. 15, 2007

Related U.S. Application Data

(60) Provisional application No. 60/717,520, filed on Sep. 15, 2005.

(51) Int. Cl.
*H01M 4/02*    (2006.01)
*H01M 2/18*    (2006.01)
*H01M 4/58*    (2006.01)
*H01M 4/66*    (2006.01)

(52) U.S. Cl. .................... 429/128; 429/141; 429/231.5; 429/231.95; 429/245

(58) Field of Classification Search ................. 429/128, 429/141, 231.5, 231.95, 245
See application file for complete search history.

(56) References Cited

U.S. PATENT DOCUMENTS

| | | | |
|---|---|---|---|
| 4,310,609 A | 1/1982 | Liang et al. | |
| 4,830,940 A | 5/1989 | Keister et al. | |
| 4,964,877 A | 10/1990 | Keister et al. | |
| 5,472,810 A | 12/1995 | Takeuchi et al. | |
| 5,516,340 A | 5/1996 | Takeuchi et al. | |
| 5,744,258 A | 4/1998 | Bai et al. | |
| 6,461,759 B1* | 10/2002 | Miller et al. | 429/127 |
| 6,551,747 B1 | 4/2003 | Gan | |
| 2003/0129485 A1* | 7/2003 | Guidi et al. | 429/128 |
| 2003/0134188 A1* | 7/2003 | Roy et al. | 429/128 |

FOREIGN PATENT DOCUMENTS

EP    1 150 366 A2    10/2001

* cited by examiner

*Primary Examiner*—Dah-Wei D Yuan
*Assistant Examiner*—Edu E Enin-Okut
(74) *Attorney, Agent, or Firm*—Michael F. Scalise

(57) ABSTRACT

A new design for a cathode having a configuration of: SVO/first current collector/$CF_x$/second current collector/SVO is described. The two cathode current collectors are vertically aligned one on top of the other in a middle region or zone of the cathode. This coincides to where a winding mandrel will be positioned to form a wound electrode assembly with an anode. The overlapping region of the two current collectors helps balance the expansion forces of the exemplary SVO and $CF_x$ active material layers. This, in turn, helps maintain a planar cathode that is more amenable to downstream processing. The use of two current collectors on opposite sides of an intermediate cathode active material also provides for enhanced reliability when cathodes are wound from the center as they lend structural integrity to outer portions of the wind.

16 Claims, 2 Drawing Sheets

SANDWICH CATHODE ELECTROCHEMICAL CELL WITH WOUND ELECTRODE ASSEMBLY

CROSS-REFERENCE TO RELATED APPLICATION

This application claims priority from provisional application Ser. No. 60/717,520, filed Sep. 15, 2005.

BACKGROUND OF THE INVENTION

1. Field of Invention

This invention relates to the conversion of chemical energy to electrical energy. In particular, the present invention relates to a new sandwich cathode design having a first cathode active material of a relatively low energy density but of a relatively high rate capability sandwiched between two current collectors and with a second cathode active material having a relatively high energy density but of a relatively low rate capability in contact with the opposite side of the current collectors. The current collectors are configured so that they only overlay or are vertically aligned one above the other in a middle zone of the electrode assembly. This middle zone extends approximately the same length as a flat winding mandrel that will later be used to wind the sandwich cathode and a lithium anode into a so called flat-folded wound electrode assembly. Such an electrode assembly is then housed in a prismatic shaped casing.

Providing the first and second current collectors only vertically aligned with each other in a middle zone where the winding begins means that as the electrode assembly is wound, the respective cathode active materials do not delaminate from the current collectors. This is because there is no place in the wind where the two current collectors experience different turn radii. The present sandwich cathode design is useful in applications where a premium is places on increased energy density, such as in power sources associated with implantable medical devices.

2. Prior Art

The use of a sandwich cathode design with dual current collectors is described in U.S. Pat. No. 6,551,747 to Gan. This patent describes a sandwich cathode having a first cathode active material of a relatively high energy density but of a relatively low rate capability, for example $CF_x$, sandwiched between two current collectors with a second cathode active material having a relatively low energy density but of a relatively high rate capability, for example SVO, in contact with the opposite sides of the current collectors. Such an exemplary cathode design has the following configuration: SVO/first current collector/$CF_x$/second current collector/SVO.

Up to now, this cathode configuration has been built in plate-type designs. However, plate-type designs are impractical for a wound cell because the current collectors extend the entire length of the active materials. A cathode comprising two current collectors extending along the entire electrode length cannot be easily wound because the turn radii of two current collectors are not the same. Consequently, the current collectors tend to separate from the cathode materials causing de-lamination. This means that prior to the present invention use of the sandwich cathode designs described in the Gan patent was limited to plate-type configurations. Such so called multi-plate designs are less efficient to manufacture than the wound electrode designs of the current invention.

SUMMARY OF THE INVENTION

Accordingly, the present invention is directed to improvements in the performance of lithium electrochemical cells by providing a new concept in electrode design for a cathode of a primary cell comprising a first cathode active material of a relatively high energy density but of a relatively low rate capability, for example $CF_x$, sandwiched between two current collectors and with a second cathode active material having a relatively low energy density but of a relatively high rate capability, for example SVO, in contact with the opposite sides of the current collectors. Such an exemplary cathode design might look like: SVO/first current collector/$CF_x$/second current collector/SVO.

However, the present invention design has the two cathode current collectors vertically aligned one on top of the other in a middle region or zone of the cathode. This coincides to where a winding mandrel will be positioned to form a wound electrode assembly with an anode. The overlapping region of the two current collectors helps balance the expansion forces of the exemplary SVO and $CF_x$ active material layers. This, in turn, helps maintain a planar cathode that is more amenable to downstream processing. The use of two current collectors on opposite sides of an intermediate cathode active material also provides for enhanced reliability when cathodes are wound from the center as they lend structural integrity to outer portions of the wind.

These and other objects of the present invention will become increasingly more apparent to those skilled in the art by reference to the following description and the appended drawings.

DETAILED DESCRIPTION OF THE PREFERRED EMBODIMENTS

Figure 1:
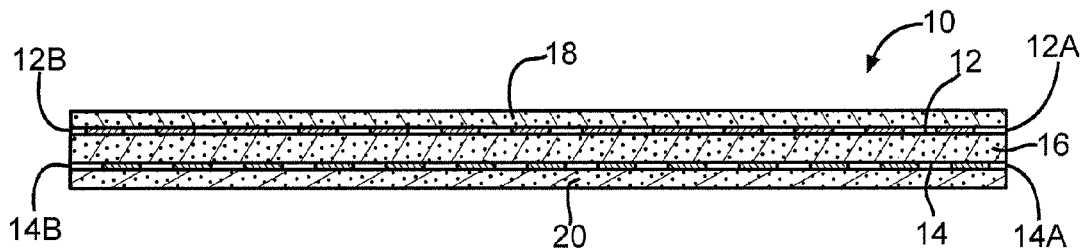
FIG. 1 is a cross-sectional view of a prior art sandwich cathode 10.

An electrochemical cell according to the present invention comprises an anode of lithium and its alloys and intermetallic compounds including, for example, Li—Si, Li—Al, Li—B, Li—Mg, and Li—Si—B. Lithium metal is preferred for the anode while lithium-aluminum is the preferred alloy. The greater the amounts of aluminum present by weight in the alloy, however, the lower the energy density of the cell.

The anode is a thin metal sheet or foil of the anode metal, pressed or rolled on a metallic anode current collector, i.e., preferably comprising titanium, titanium alloy or nickel. Copper, tungsten and tantalum are also suitable materials for the anode current collector. The anode current collector has an integral extending tab or lead contacted by a weld to a cell case of conductive metal in a case-negative electrical configuration.

The electrochemical cell further comprises a cathode of electrically conductive materials which serve as the other electrode of the cell. The cathode is preferably of solid materials and the electrochemical reaction at the cathode involves conversion of ions which migrate from the anode to the cathode into atomic or molecular forms. The solid cathode may comprise a first active material of a carbonaceous chemistry and a second active material of a metal element, a metal oxide, a mixed metal oxide and a metal sulfide, and combinations thereof. The metal oxide, the mixed metal oxide and the metal sulfide of the second active material have a relatively lower energy density but a relatively higher rate capability than the first carbonaceous active material.

More particularly, the first active material is of a relatively high energy density and a relatively low rate capability in comparison to the second cathode active material. The first active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

The sandwich cathode design of the present invention further includes a second active material formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds. A preferred second cathode active material is a reaction product of at least silver and vanadium.

One preferred mixed metal oxide is a transition metal oxide having the general formula $SM_xV_2O_y$, where SM is a metal selected from Groups IB to VIIB and VIII of the Periodic Table of Elements, and wherein x is about 0.30 to 2.0 and y is about 4.5 to 6.0 in the general formula. One exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al. This patent is assigned to the assignee of the present invention and incorporated herein by reference.

Another preferred composite transition metal oxide cathode material includes $V_2O_z$ wherein $z \leq 5$ combined with $Ag_2O$ having silver in either the silver(II), silver(I) or silver (0) oxidation state and CuO with copper in either the copper (II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In a broader sense, it is contemplated by the scope of the present invention that the first active material of the present sandwich cathode design is any material which has a relatively higher energy density but a relatively lower rate capability than the second active material. In addition to fluorinated carbon, $Ag_2O$, $Ag_2O_2$, $CuF_2$, $Ag_2CrO_4$, $MnO_2$, and even SVO in any one of its phases, are useful as the first active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the second active material.

This means that the present invention broadly defines a cathode configuration comprising: first active material/first current collector/second active material/second current collector/third active material, where the first and third active materials can be the same or different, but are of a material or materials that have a relatively higher rate capability, but a lower energy density than the second active material. The second active material has a relatively higher energy density, but a lower rate capability than both the first and third active materials, regardless whether they are the same or different.

Before fabrication into a sandwich electrode for incorporation into an electrochemical cell according to the present invention, the first and second cathode active materials are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

Cathode components for incorporation into an electrochemical cell may be prepared by rolling, spreading or pressing the first and second cathode active materials onto a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is titanium, and most preferably the titanium cathode current collector has a thin layer of graphite/carbon applied thereto. Cathodes prepared as described above are in the form of a strip wound with a corresponding strip of anode material in a structure similar to a "jellyroll".

In order to prevent internal short circuit conditions, the sandwich cathode is separated from the lithium-containing anode by a suitable separator material. The separator is of electrically insulative material that is chemically unreactive with the anode and cathode active materials and both chemically unreactive with and insoluble in the electrolyte. In addition, the separator material has a degree of porosity sufficient to allow flow there through of the electrolyte during electrochemical reactions of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte which serves as a medium for migration of ions between the anode and the cathode during electrochemical reactions of the cell. The electrochemical reaction at the electrodes involves conversion of ions in atomic or molecular forms which migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable lithium salt dissolved in a mixture of aprotic organic solvents comprising a low viscosity solvent and a high permittivity solvent. The inorganic, ionically conductive lithium salt serves as the vehicle for migration of the lithium ions to intercalate or react with the cathode active materials. Known lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_3F$, $LiB(C_6H_5)_4$, $LiCF_3SO_3$, and mixtures thereof.

Low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. The electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

According to the present invention, $CF_x$ cathode material, which provides a relatively low power or rate capability but a relatively high energy density or volumetric capability, and SVO cathode material, which has a relatively low energy density but a relatively high rate capability, are individually pressed on opposite sides of a current collector screen. This puts both cathode materials in direct contact with the current collector. One exemplary cathode plate has the following configuration:

SVO/first current collector/$CF_x$/second current collector/SVO

This cathode configuration is described in the previously discussed U.S. Pat. No. 6,551,747 to Gan and illustrated in FIG. 1. Even though this drawing is a cross-sectional view, it is meant to show that the cathode 10 comprises a first current collector 12 spaced from a second current collector 14 by an intermediate first cathode active material 16. A second cathode active material 18 contacts the first current collector 12 opposite the first active material 16. A third cathode active material 20 contacts the second current collector 14 opposite the first cathode active material 12. This provided the first cathode material 16 "sandwiched" between the current collectors 12, 14 and between the second and third cathode active materials 18, 20. Preferably the second and third active material 18, 20 are the same as each other, for example SVO, but different than the first active material 16, which is, for example $CF_x$.

The first current collector 12 has opposed ends 12A, 12B, each extending to spaced apart edges (not shown). Similarly, the second current collector 14 has opposed ends 14A, 14B, each extending to spaced apart edges (not shown). In that respect, the first and second current collectors 12, 14 both have a generally rectangular shape in plan view with their respective lengths between the opposed ends 12A, 12B and 14A, 14B being substantially equal to each other and significantly longer than their widths between the edges. The first and second current collectors 12, 14 are of similar widths. The current collectors 12, 14 are preferably perforated.

The above described sandwich cathode construction is a significant advancement in electrochemical cells used for high rate discharge applications, such as are required for powering cardiac defibrillators, and the like. This is because in the sandwich cathode design, the high volumetric capacity $CF_x$ active material is quantitatively converted into or used as the high power energy of the SVO material. It is believed that during high energy pulsing, all the discharge energy is provided by the SVO material. Above the discharge voltage of the $CF_x$ active material, the SVO material provides all of the energy for pulsing as well as for any background load discharging. Under these conditions, the $CF_x$ active material is polarized with respect to the SVO material. Then, when the lithium cell is discharged to the working voltage of the $CF_x$ material, both the SVO and $CF_x$ active materials provide the energy for background load discharging. However, only the SVO material provides energy for high rate pulse discharging. After the SVO active material is pulse discharged, such as during activation of the cardiac defibrillator, the potential of the SVO material tends to drop due to loss of capacity. Then, when the SVO background voltage drops below the working voltage of the $CF_x$ material, the SVO material is believed to be charged by the $CF_x$ material to bring the discharge voltage of the sandwich cathode materials to an equal value. In that respect, it is believed that the SVO material acts as a rechargeable electrode while at the same time the $CF_x$ material acts as a charger or energy reservoir. As a result, both active materials reach end of service life at the same time.

Conventional manufacturing techniques have up to now limited sandwich electrodes (FIG. 1) to plate-type designs incorporated into so called "multiplate" electrochemical cells. These designs can take the form of both the anode and cathode comprising one or more plates electrically connected to respective terminals or the anode can be a relatively long sheet provided in a serpentine shape with cathode plates interleaved between the folds. This latter cell design in described in U.S. Pat. Nos. 4,830,940 and 4,964,877, both to Keister et al. and both assigned to the assignee of the present invention and incorporated herein by reference. While readily adapted to multiplate designs, the sandwich cathode design shown in FIG. 1 is not practical for a wound or jellyroll-type cell. The reason is that the current collectors 12, 14 extending the entire length of the active materials have different turn radii during winding. As a result, the current collectors 12, 14 tend to separate from the cathode materials 16, 18 and 20, causing de-lamination during winding. Of course, in electrochemical applications it is important that the active material in any electrode design maintain intimate electrical contact to its current collector throughout the entire discharge life of the cell.

Figure 2:
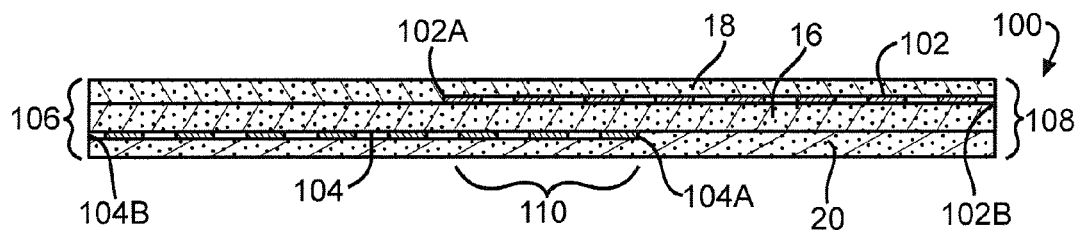
FIG. 2 is a cross-sectional view of a sandwich cathode 100 according to the present invention.
Figure 3:
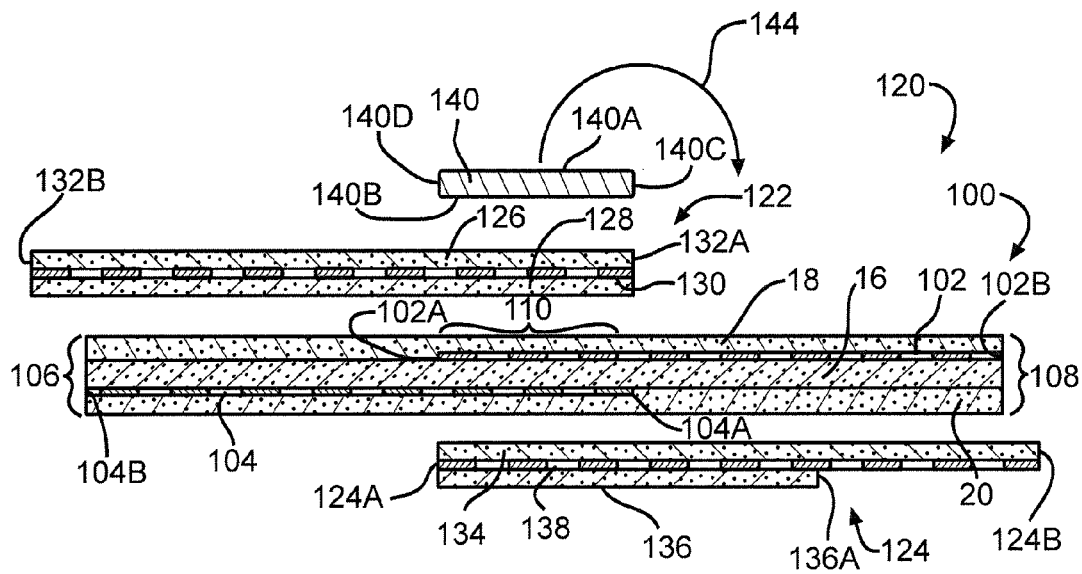
FIG. 3 is a cross-sectional view of sandwich cathode 100 shown in FIG. 2 configured with anode portions 122 and 124 and a winding mandrel 140 for providing a flat-folded wound electrode assembly.
Figure 4:
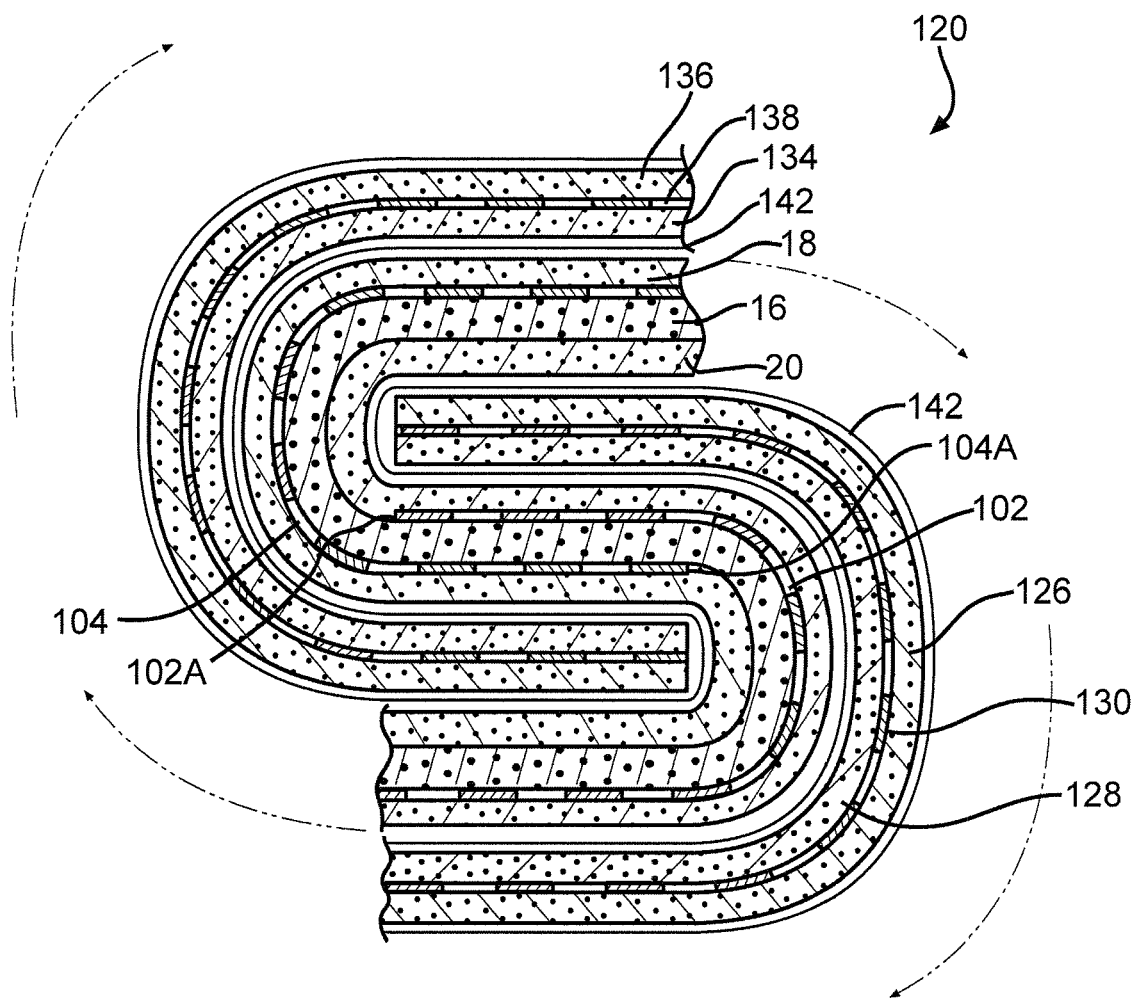
FIG. 4 is a cross-sectional view of the electrode assembly 120 resulting from winding the sandwich cathode 100 and anode portions 122, 124 of FIG. 3.

In that light, FIGS. 2 to 4 illustrate a preferred embodiment of a new sandwich electrode design according to the present invention. This electrode design maintains the benefits of combining both a high energy density material, for example $CF_x$, sandwiched between two current collectors with a high rate material, for example SVO, contacting the opposite sides of the current collectors. As particularly shown in the cross-sectional view of FIG. 2, the cathode 100 comprises a first current collector 102 spaced from a second current collector 104 by the intermediate first cathode active material 16. The first current collector 102 has opposed proximal and distal ends 102A, 102B, each extending to spaced apart edges (not shown). However, unlike the prior art cathode 10 shown in FIG. 1, the opposed ends 102A, 102B of the first current collector 102 do not extend the entire length of the electrode. Instead, the proximal, inner end 102A is embedded between the first and second active materials 16, 18, terminating a substantial distance spaced from the common left end 106 of the active materials 16, 18 and 20. Similarly, the opposed proximal and distal ends 104A, 104B of the second current collector 104 do not extend the entire length of the electrode 100. Instead, the proximal, inner end 104A is embedded between the first and third active materials 16, 20, terminating a substantial distance spaced from the common right end 108 of the active materials 16, 18 and 20. The opposite distal ends 102B, 104B of the current collectors 102, 104 extend to the respective common ends 108, 106. The current collectors 102, 104 are preferably perforated.

The first and second current collectors 102, 104 both have a generally rectangular shape in plan view with their lengths between their respective opposed ends 102A, 102B and 104A, 104B being substantially equal to each other and significantly longer than their widths between their respective edges. The first and second current collectors 102, 104 are of similar widths. However, the current collectors 102, 104 are only vertically aligned one over the other in a middle zone 110. The length of the middle zone 110 is significantly shorted than the lengths of the respective current collectors 102, 104. The middle zone 110 is also significantly shorter than the length of the electrode 100 between the common ends 106, 108. In that respect, the first and second current collectors 102, 104 are vertically aligned one on top of the other only in the middle region 110 about midway between the first and second cathode ends and extending outwardly from the middle region to the first and second distal current collector ends 102B, 104B located at the respective first and second ends of the cathode.

In this novel cathode construction, the first and second active materials 16, 18 are separated from each other where they contact the opposite sides of the first current collector 102, but they are in direct contact with each other at a first contiguous boundary left of the proximal inner edge 102A. Similarly, the first and third active materials 16, 20 are separated from each other where they contact the opposite sides of the second current collector 104, but they are in direct contact with each other at a second contiguous boundary right of the proximal inner edge 104A. The first and second contiguous portions extend to the opposed cathode ends with the first and second current collectors 102, 104 being vertically aligned one on top of the other only in the middle region 110 about midway between the first and second cathode ends and intermediate the first and second contiguous portions.

FIG. 3 shows the cathode 100 being wound into an electrode assembly 120 with an anode. The anode is of lithium and is provided in two portions 122, 124. The first anode portion 122 comprises opposed sheets of lithium 126, 128 press-contacted to a first perforated anode current collector 130. The lithium sheets 126, 128 are of equal lengths and widths. This anode portion 122 has a length extending to the opposed proximal and distal ends 132A, 132B. The right edge of the proximal end 132A is vertically aligned with the proximal end 104A of the second current collector 104 while the left, distal end 132B extends beyond the common edge 106 a relatively short distance.

The second anode portion 124 comprises opposed sheets of lithium 134, 136 press-contacted to a second perforated anode current collector 138. Anode portion 124 has a length extending to the opposed proximal and distal ends 124A, 124B. The left edge of the proximal end 124A is vertically aligned with the inner, proximal edge 102A of the first current collector 102. The distal end 124B extends beyond the common edge 108 a relatively short distance. Also, the lithium sheets 134, 136 are not of the same length. Instead, the lower sheet 136 is shorter than the upper sheet 134 with its right, distal edge 136A terminating vertically between the proximal edge 104A of the second current collector 104 and the common edge 108. The lithium sheets 134, 136 are of equal widths.

To provide the electrode assembly 120 (FIG. 4), a mandrel 140 having opposed flat sides 140A, 140B extending to flat edges 140C, 140D is placed against the first anode portion 122. Prior to winding, the short edge 140C is aligned with the proximal end 132A of the first anode portion 122. Separator material 142 is disposed between the anode portions 122, 124 and the cathode 100 to prevent direct physical contact between them. As indicated by arrow 144, the mandrel 140 is then rotated to the right so that its edge 140C rolls over the proximal end 132A of the first anode portion 122 and onto the cathode 100. Since the opposed current collectors 102, 104 overlap only in the middle zone 110 under the mandrel 140 where the wind starts, each turn in the cathode results in bending only one of the current collectors. This means that even though the two opposing current collectors 102, 104 have different winding radii there is no delaminating of the active material 16, 18 and 20 from them. In the middle zone 110 under the winding mandrel, the current collectors are not formed into shapes having radii by the winding process. In locations spaced from the mandrel 140, the current collectors 102, 104 are never vertically above each other, so there cannot be a difference in radii between them there. After the winding is complete, the mandrel is removed from the thusly formed electrode assembly 120.

Although not shown in FIG. 4, the disparity in the lengths of the anode sheets 134, 136 of the second anode portion 124 should be noted. The shorter sheet 136 ends up as the outermost layer of the wound electrode assembly 120. The difference in its length with that of sheet 134 is so that there is no lithium contacting the current collector 138 adjacent to the sidewall of the casing (not shown) into which the electrode assembly is housed. There is no cathode active material facing this part of the anode portion 124, so to have lithium on the outer wrap facing the casing sidewall would be wasted volume. If desired, the bare portion of the current collector 138 can be in direct contact with the casing sidewall to help bolster the electrical contact with the negative polarity anode and the casing serving as the negative terminal.

In another aspect of the invention, there is a minimum of two cathode layers between each cathode current collector and the anode on the outside bend of each wind. This is achieved by placing the anodes on the side of the cathode away from the cathode current collectors prior to winding. The porous cathode current collectors 102, 104 are preferably photoetched screens, perforated foils or of expanded metal. In any event, bending these materials with a tight radius can produce sharp edges on the outside of the bend. In the present invention, it is desirable to have the high power material layer, for example SVO, as thin as possible in order to maximize the amount and properties of the high energy density material, for example $CF_x$. However, if the thickness of the active material between the cathode current collectors and the anode becomes too thin, the sharp edges from the wound current collector could protrude through the cathode material and contact the separator. If the edges cut through the separator a short can result creating an unacceptable situation from a reliability standpoint. In that respect, the present invention orients the two current collectors 102, 104 such that any sharp edges on the outside of each bend are buried beneath at least two cathode layers preventing any possibility of the current collectors contacting separator 142. In this way, the high power material layer can be as thin as possible in order to satisfy the power requirements of the device. This cannot be achieved with a single cathode current collector design.

While the present invention has been described with respect to a preferred embodiment of: SVO/first current collector/$CF_x$/second current collector/SVO, that is by way of example only. Another embodiment comprising two current collectors that only overlap each other in a middle zone to facilitate providing a wound electrode assembly has the following configuration:

SVO/first current collector/SVO/$CF_x$/SVO/second current collector/SVO

In both embodiments, the high capacity material having the low rate capability is preferably positioned between two layers of high rate cathode material (either high or low capacities). In other words, the exemplary $CF_x$ material never directly faces the lithium anode. In addition, the low rate cathode material must be short circuited with the high rate material, either by direct contact as demonstrated above in the second example, or by parallel connection through the perforated current collectors as in the first above illustrated embodiment.

Silver vanadium oxide and, in particular, $\epsilon$-phase silver vanadium oxide ($AgV_2O_{5.5}$), has a theoretical volumetric capacity of 1.37 Ah/ml. By comparison, the theoretical volumetric capacity of $CF_x$ material (x=1.1) is 2.42 Ah/ml, which is 1.77 times that of $\epsilon$-phase silver vanadium oxide. Since $CF_x$ material has significantly higher volumetric capacity than that of SVO material, i.e., approximately 1.77 times greater, in order to optimize the final cell capacity, the amount of $CF_x$ material should be maximized and the amount of SVO material used should be minimized to the point that it is still practical in engineering and acceptable in electrochemical performance. Further, end of service life indication is the same as that of a standard Li/SVO cell. And, it has been determined that the SVO electrode material and the $CF_x$ electrode material according to the present invention reach end of life at the same time. This is the case regardless of the use of the cell. Since both electrode materials reach end of service life at the same time, no energy capacity is wasted.

Cells of the present invention are particularly well suited for powering implantable medical devices requiring a relatively low to medium discharge rate. An exemplary device is a cardiac pacemaker. In such devices, it is important to have a reliable and predictable end-of-life (EOL) or end-of-replacement indicator (ERI) for the device. While Li/$CF_x$ cells are generally acceptable as a power source for these types of applications, this chemistry has a relatively flat or constant discharge curve until just before end of life, when it becomes somewhat steep. This makes it difficult for a medical professional to time and plan replacement surgery.

Therefore, in addition to augmenting the discharge performance of a $CF_x$ cell, the SVO cathode material provides a predictable and familiar EOL discharge curve. In the discharge of a cathode according to the present invention, the SVO component is the power source from about 3.6 volts through the first voltage plateau at about 3.2 volts to about 2.8 volts. At about 2.8 volts, the $CF_x$ component is discharged until about 2.6 volts, at which time the $CF_x$ material is essentially depleted. Then, the SVO material is discharged again to EOL at 2.0 volts. The discharge of a Li/SVO cell at about 2.6 volts is referred to as the second voltage plateau. In this manner, the present cathode configuration provides a lithium cell with a very reliable and predictable EOL indication for replacement surgery. In that respect, the present cell is particularly useful for powering an implantable medical device, such as a cardiac pacemaker, cardiac defibrillator, drug pump, nerve stimulator, and the like.

The preferred form of the electrochemical cell is a case-negative design wherein the anode is in contact with a conductive metal casing and the cathode current collectors are weld contacted to a positive terminal pin via a extending from the current collectors. A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode. The anode is preferably connected to the case or the lid. An additional opening is provided for electrolyte filling. The cell is thereafter filled with the electrolyte solution described hereinabove and hermetically sealed, such as by close-welding a titanium plug over the fill hole. The cell of the present invention can also be constructed in a case-positive design.

The following example describes the manufacture of a cell according to the present invention:

EXAMPLE

A cathode assembly was prepared by extruding and rolling SVO material in a matrix of binder and conductive additive to a thickness such that there was 242 mg of SVO per square inch. Similarly, $CF_x$ in a matrix of binder and conductive additive was formed to a thickness where there was 205 mg of the active material per square inch. Sheets containing the two materials were punched to provide a blank with surface area equal to 4.51 $in^2$. The active layers were pressed together at about 10 tons/$in^2$ along with two perforated carbon-coated titanium current collectors to provide a cathode of the form SVO/current collector/$CF_x$/current collector/SVO. The total surface area of the electrode assembly was 8.903 $in^2$. The cathode was heat-sealed inside a polyethylene separator.

Two anode assemblies were prepared by brushing and pressing a lithium ribbon (0.0073" thick) on either side of a nickel current collector. The two anodes were heat-sealed in polyethylene. The three electrodes (two anodes and one cathode) were oriented as shown in FIG. 3 and wound in a clockwise direction around a 0.55" mandrel to provide an electrode assembly as that shown in FIG. 4. The electrode assembly was placed into a stainless steel can and the anode tabs were welded thereto. The cathode tabs were welded together and then to the cathode terminal. The header was applied and the cell was activated with an electrolyte of 3.0 grams of 1M $LiAsF_6$ in PC:DME (50:50).

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode of lithium;
   b) an elongate cathode having a length extending to opposed first and second cathode ends, the cathode comprising: a first cathode active material/first current collector/second cathode active material/second current collector/third cathode active material, wherein the first and third cathode active materials are the same or different and are of a material or materials that have a relatively higher rate capability, but a lower energy density than the second cathode active material, wherein the first current collector extends from a first proximal end of a first inner portion to a first distal end and the second current collector extends from a second proximal end of a second inner portion to a second distal end with the first and second current collectors being aligned one on top of the other only in a middle region where the first and second inner portions of the cathode current collectors overlap about midway between the first and second cathode ends and wherein a percentage of overlap of the first inner portion of the first cathode current collector with the second inner portion of the second cathode current collector is less than half the length of the cathode measured from the first distal end to the second distal end; and
   d) a nonaqueous electrolyte activating the anode and the cathode.

2. The electrochemical cell of claim 1 wherein the second cathode active material is selected from the group consisting of $CF_x$, $Ag_2O$, $Ag_2O_2$, $CuF$, $Ag_2CrO_4$, $MnO_2$, SVO, and mixtures thereof.

3. The electrochemical cell of claim 1 wherein the cathode has the configuration: SVO/first current collector/$CF_x$/second current collector/SVO.

4. The electrochemical cell of claim 1 wherein the first and second current collectors are selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

5. The electrochemical cell of claim 1 wherein the first and second current collectors are titanium having a coating selected from the group consisting of graphite/carbon material, iridium, iridium oxide and platinum provided thereon.

6. The electrochemical cell of claim 1 wherein the first and third cathode active materials are SVO, the second cathode active material is $CF_x$ and the first and second current collectors are titanium.

7. The electrochemical cell of claim 1 wherein the electrolyte comprises at least one solvent selected from the group consisting of tetrahydrofuran, methyl acetate, diglyme, trigylme, tetragylme, dimethyl carbonate, 1,2-dimethoxyethane, 1,2-diethoxyethane, 1-ethoxy,2-methoxyethane, ethyl methyl carbonate, methyl propyl carbonate, ethyl propyl carbonate, diethyl carbonate, dipropyl carbonate, propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

8. The electrochemical cell of claim 1 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

9. The electrochemical cell of claim 1 wherein the electrolyte is 0.8M to 1.5M $LiAsF_6$ or $LiPF_6$ dissolved in a 50:50 mixture, by volume, of propylene carbonate and 1,2-dimethoxyethane.

10. A method for providing an elongate cathode having opposed first and second ends extending to spaced apart edges, comprising the steps of:
    a) providing a first cathode active material, a second cathode active material and a third cathode active material, wherein the first and third cathode active materials are the same or different and are of a material or materials that have a relatively higher rate capability, but a lower energy density than the second cathode active material;
    b) providing a first cathode current collector and a second cathode current collector, the first current collector extending from a first proximal end of a first inner portion to a first distal end and the second current collector extending from a second proximal end of a second inner portion to a second distal end;
    c) contacting the first, second and third cathode active materials to the first and second cathode current collectors followed by aligning the first cathode current collector on top of the second cathode current collector only in a middle region about midway between the first and second cathode ends to form the cathode having a configuration: the first cathode active material/first current collector/second cathode active material/second current collector/third cathode active material and wherein a percentage of overlap of the first inner portion of the first cathode current collector with the second inner portion of the second cathode current collector is less than half the length of the cathode measured from the first distal end to the second distal end.

11. The method of claim 10 including selecting the first and third cathode active materials from the group consisting of silver vanadium oxide (SVO), copper silver vanadium oxide (CSVO), $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, and mixtures thereof and selecting the second cathode active material from the group consisting of $CF_x$, $Ag_2O$, $Ag_2O_2$, $CuF$, $Ag_2CrO_4$, $MnO_2$, SVO, and mixtures thereof.

12. The method of claim 10 including providing the cathode having the configuration: SVO/first current collector/$CF_x$/second current collector/SVO.

13. The method of claim 10 including selecting the first and second current collectors from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

14. The method of claim 10 including providing the first and second current collectors being titanium having a coating selected from the group consisting of graphite/carbon material, iridium, iridium oxide and platinum provided thereon.

15. The method of claim 10 including providing the first and third cathode active materials being SVO, the second cathode active material being $CF_x$ and the first and second current collectors being titanium.

16. The electrochemical cell of claim 1 wherein the first and third cathode active materials are selected from the group consisting of silver vanadium oxide (SVO), copper silver vanadium oxide (CSVO), $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, and mixtures thereof.

* * * * *